UNITED STATES PATENT OFFICE.

FRANZ ELGER, OF BASEL, SWITZERLAND.

COMPOUND OF GUAIACOL AND PROCESS OF MAKING SAME.

951,634.        Specification of Letters Patent.    Patented Mar. 8, 1910.

No Drawing.    Application filed November 5, 1908.    Serial No. 461,234.    (Specimens.)

*To all whom it may concern:*

Be it known that I, FRANZ ELGER, a subject of the Austro-Hungarian Emperor, residing at Basel, Switzerland, have invented a certain new and useful Compound of Guaiacol and Process for the Manufacture of the Same, of which the following is a specification.

The researches of Moschatos and Tollens (*Liebig's Annalen der Chemie*, Vol. 272, page 280) have shown, that it is possible for hexamethylene tetramin to combine with phenols and thereby to form bodies having characteristic properties. These products, which in modern times are considered as compounds of molecules, especially those having a low melting point, constitute a very convenient form of phenols, inasmuch as these phenols can be easily regenerated from them, for instance, by distillation in a current of steam. In the above mentioned report Moschatos and Tollens state, that it is not practicable to obtain such products from phenols having a complicated constitution, for instance, guaiacol. Contrary to these statements, I have found that it is possible, to combine pure crystallized guaiacol with hexamethylene tetramin to form a product, which from its composition must be designated as hexamethylene tetramin triguaiacol.

Example I: To a warm solution of 6 kilograms of hexamethylene tetramin in 8 liters of water are added 4 kilos of crystallized guaiacol, and the mixture is heated over a bath of boiling water until a clear solution has been produced. On cooling the new body crystallizes out in the shape of long brilliant needles.

Hexamethylene tetramin-triguaiacol, as is the case with hexamethylene tetramin-triphenol, has no sharply defined melting point. It commences to soften above 80° C. and melts at about 95° C. to a turbid liquid. It is easily soluble in cold alcohol and in chloroform. If water is poured on the said body, oily drops of guaiacol separate out, but while pure guaiacol requires from 60–70 parts of water to dissolve it, hexamethylene tetramin-triguaiacol yields a clear solution with 25 parts of water. By distillation in a current of steam it is possible to recover from 100 grams of the compound 70 grams of pure crystallized guaiacol.

The formation of the hexamethylene-tetramin triguaiacol takes place in the manner indicated by the equation

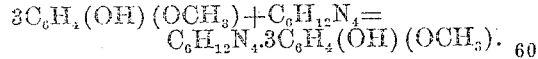

Example II: Instead of the crystallized hexamethylene-amin of Example I we may directly employ the solution obtainable by adding ammonia to a 40 per cent. formaldehyde solution and proceed otherwise as in Example I.

Example III: To a 40 per cent. solution of formaldehyde is added a concentrated solution of guaiacol-ammonium, and the solution cooled externally, if required. The further treatment is as in Example I.

The new compound is suitable for therapeutic purposes, especially as a remedy for pulmonary consumption and as an antiseptic for the intestine, in the place of guaiacol. It has the advantage over guaiacol in that it will not liquefy at a temperature below 80° C., and is therefore easier to handle. Further, the hexamethylene-tetramin contained in the compound has antiseptic properties and will therefore assist the guaiacol contained in the compound.

What I claim is:—

1. The process for the production of hexamethylene-tetramin-triguaiacol, which consists in causing guaiacol to act on hexamethylene-tetramin in concentrated aqueous solution, substantially as described.

2. As a new product, hexamethylene-tetramin-triguaiacol, being a compound capable of crystallizing in the shape of brilliant needles, beginning to soften above 80° C., melting at about 95° C. to a turbid liquid, forming with 25 parts of water a clear solution, easily soluble in cold alcohol and in chloroform and yielding guaiacol, when distilled in a current of steam, substantially as described.

In testimony whereof I have hereunto set my hand in presence of two subscribing witnesses.

FRANZ ELGER.

Witnesses:
E. BARELL,
KARL SIEBENEICHER.